United States Patent
Hu et al.

(10) Patent No.: US 11,682,987 B2
(45) Date of Patent: Jun. 20, 2023

(54) DRIVE CONTROL METHOD, DRIVE SYSTEM, PROCESSING SYSTEM AND STORAGE MEDIUM

(71) Applicant: Siemens Aktiengesellschaft, Munich (DE)

(72) Inventors: Hao Hu, Nanjing (CN); Yong Lin Guo, Nanjing (CN); Bin Li, Nanjing (CN); Yu Wang, Nanjing (CN); Peng Cheng Li, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/051,510

(22) PCT Filed: May 2, 2019

(86) PCT No.: PCT/EP2019/061191
§ 371 (c)(1),
(2) Date: Oct. 29, 2020

(87) PCT Pub. No.: WO2019/211355
PCT Pub. Date: Nov. 7, 2019

(65) Prior Publication Data
US 2021/0194392 A1 Jun. 24, 2021

(30) Foreign Application Priority Data
May 2, 2018 (CN) .......................... 201810409406.3

(51) Int. Cl.
*H02P 1/04* (2006.01)
*H02P 1/02* (2006.01)
*H04L 12/40* (2006.01)

(52) U.S. Cl.
CPC ................ *H02P 1/04* (2013.01); *H02P 1/025* (2013.01); *H04L 12/40* (2013.01); *H04L 2012/40273* (2013.01)

(58) Field of Classification Search
CPC .... H02P 1/04; H02P 1/26; H02P 1/025; H02P 1/10; H02P 1/28; H02P 1/40; H02P 1/00; H02P 5/46; H04L 12/40
See application file for complete search history.

(56) References Cited

U.S. PATENT DOCUMENTS

| | | | |
|---|---|---|---|
| 6,801,013 B2 * | 10/2004 | Woodward | H02P 25/04 318/729 |
| 2004/0066160 A1 * | 4/2004 | Woodward | H02P 1/44 318/430 |

(Continued)

FOREIGN PATENT DOCUMENTS

| | | |
|---|---|---|
| CN | 102156233 A | 8/2011 |
| CN | 103901301 A | 7/2014 |

(Continued)

OTHER PUBLICATIONS

International Search Report PCT/ISA/210 and Written Opinion of the International Searching Authority PCT/ISA/23 for International Application No. PCT/EP2019/061191 dated Jun. 28, 2019.

(Continued)

*Primary Examiner* — Muhammad S Islam
(74) *Attorney, Agent, or Firm* — Harness, Dickey & Pierce, P.L.C.

(57) ABSTRACT

A drive control method is applicable to a drive system including a driver, a bus and a motor, the motor being directly connected to the bus in a first connection mode or connected to the driver in a second connection mode. The drive control method includes the driver feeding an electric signal to the motor through the output port and simultaneously detecting its own actual output feature; and the driver (Continued)

determining whether the output port is connected to the bus according to the actual output feature. Upon the output port being determined not to be connected to the bus, the driver starts the motor normally. Upon the output port being determined to be connected to the bus, the driver disconnects the output port. In addition, a corresponding drive system, a processing system and a storage medium are disclosed.

18 Claims, 5 Drawing Sheets

(56) References Cited

U.S. PATENT DOCUMENTS

| | | | |
|---|---|---|---|
| 2004/0067049 A1* | 4/2004 | Woodward | H02P 25/04 388/801 |
| 2004/0067050 A1* | 4/2004 | Woodward | H02P 25/04 388/804 |
| 2005/0035664 A1 | 2/2005 | Zver et al. | |
| 2005/0162108 A1* | 7/2005 | Pant | H02P 1/18 318/400.01 |
| 2013/0099567 A1 | 4/2013 | Pfitzer | |

FOREIGN PATENT DOCUMENTS

| | | |
|---|---|---|
| CN | 104539196 A | 4/2015 |
| EP | 2639958 A2 | 9/2013 |

OTHER PUBLICATIONS

Office Action for Chinese Patent Application No. 201810409406.3 dated Oct. 17, 2022.

* cited by examiner

DRIVE CONTROL METHOD, DRIVE SYSTEM, PROCESSING SYSTEM AND STORAGE MEDIUM

PRIORITY STATEMENT

This application is the national phase under 35 U.S.C. § 371 of PCT International Application No. PCT/EP2019/061191 which has an International filing date of May 2, 2019, which designated the United States of America and which claims priority to Chinese patent application CN 201810409406.3 filed May 2, 2018, the contents of each of which are hereby incorporated by reference herein, in their entirety and for all purposes.

FIELD

Embodiments of the invention generally relate to the industrial control field, and in particular relates to a drive control method, a drive system, a processing system and a storage medium.

BACKGROUND

In many application fields, an induction motor can be directly connected to a bus, namely, a line end, or can be connected to and controlled by a driver/inverter. When the motor is directly connected to the bus, the switch will influence the line end. When the motor is controlled by the driver/inverter, the start and stop are gentle and will ease the influence on the line end.

For example, FIG. 1 shows an application example of a motor bypass of the prior art. In the example, when the switch KD1 is connected and the switch KM1 is disconnected, the motor M1 is controlled by the driver 1. In this case, the motor M1 can be gently started, accelerated, slowed down and stopped, and the running speed is adjustable. In addition, when the motor M1 runs synchronously, the motor M1 can be directly connected to the line end by disconnecting the switch KD1 and connecting the switch KM1, without the control of the driver 1. In this case, the driver 1 stops working and the speed of the motor M1 is not adjustable.

FIG. 2 shows an application example of the multi-pump control for controlling the hydraulic pressure. A plurality of motors (pumps) work concurrently and the driver 1 is used as a starter and controller of the motors. In the example, the pressure is controlled by the proportional-integral-differential (PID) controller in the driver 1. When motor M1 is connected to the line end, motor M2 is started by the driver 1 and motors M3 and M4 are in standby mode. If motor M2 reaches the highest speed and the PID error is still lower than a threshold, an additional motor needs to be added. Then motor M2 is switched to the line end and motor M3 is started by the driver 1. Contrarily, if motor M2 reaches the lowest speed and the PID error is still higher than the threshold, a motor needs to be removed. Then motor M2 stops, and M1 is controlled by the driver 1.

For the two examples in FIG. 1 and FIG. 2, KDx and KMx must be interlocked. That is to say, the two must not be connected simultaneously. Otherwise, the output port of the driver will be connected to the line end, which may cause the driver to be destroyed by burning.

For this problem, an interlock switch is used in a solution of the prior art to guarantee the interlocking relationship between KDx and KMx. The cost of such a method realized by the mechanical mechanism is high.

In another solution of the prior art, the auxiliary contacts of the switches are connected the DI ports of the drive control unit (DCU), as shown in FIG. 3. The driver can check the switch state according to the signals at the auxiliary contacts and then detects the interlocking relationship. However, the number of DI ports of the driver is limited and such a solution will occupy the rare DI ports of the driver. In addition, a programmable logic controller (PLC) must be used in such a solution, and thus the cost of realizing such a solution is high.

SUMMARY

Embodiments of the present invention presents a drive control method, a drive system, a processing system and a storage medium. In at least one embodiment of the present invention, the interlocking relationship can be checked by use of the drive control method realized by the software (firmware) of the driver. After the connection relationship is switched over, the driver will not directly output a current or voltage to the motor, but will first feed a voltage or current signal. In this case, the driver will measure the actual output feature of the driver to determine whether the output port is connected to the bus. That is to say, at least one embodiment of the present invention can detect the interlocking state by use of the control method to automatically protect the driver itself and improve the stability and reliability of the system. The realization of the drive control technique requires no modification to the circuit or structure of the driver of the prior art.

According to one embodiment of the present invention, a drive control method applicable to a drive system comprising a driver, a bus and a motor is provided, wherein the motor is directly connected to the bus (first connection mode) or connected to the driver (second connection mode), and the drive control method comprises:

the driver feeding an electric signal to the motor through the output port and simultaneously detecting its own actual output feature;

the driver determining whether the output port is connected to the bus according to the actual output feature;

if the output port is not connected to the bus, the driver starting the motor normally;

if the output port is connected to the bus, the driver disconnecting the output port.

According to another embodiment of the present invention, a drive system is provided and the drive system comprises a driver, a bus and a motor, wherein the motor is directly connected to the bus (first connection mode) or connected to the driver (second connection mode), wherein the driver feeds an electric signal to the motors through the output port and simultaneously detects its own actual output feature;

wherein the driver determines whether the output port is connected to the bus according to the actual output feature, if the output port is not connected to the bus, the driver starts the motors normally, and if the output port is connected to the bus, the driver disconnects the output port.

According to a further embodiment of the present invention, a processing system is provided and the processing system comprises:

one or more processors, a memory, and one or more programs stored in the memory and configured to be executed by the one or more processors. The one or more programs comprise instructions for executing the method of at least one embodiment.

According to a fourth embodiment of the present invention, a storage medium is provided, the storage medium stores one or more programs, the one or more programs comprise instructions, and when the instructions are executed by a data processing system, the data processing system executes the method of at least one embodiment.

BRIEF DESCRIPTION OF THE DRAWINGS

The attached drawings provide a further understanding of the present invention and they are included in the present application and constitute a part of the present application. The attached drawings show the embodiments of the present invention and together with the description also explain the principle of the present invention. In the drawings.

DETAILED DESCRIPTION OF THE EXAMPLE EMBODIMENTS

Figure 1:
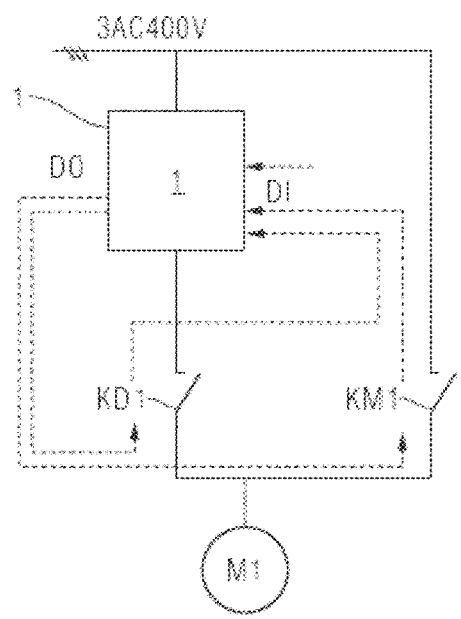
FIG. 1 shows an application example of a motor bypass of the prior art.

According to one embodiment of the present invention, a drive control method applicable to a drive system comprising a driver, a bus and a motor is provided, wherein the motor is directly connected to the bus (first connection mode) or connected to the driver (second connection mode), and the drive control method comprises:

the driver feeding an electric signal to the motor through the output port and simultaneously detecting its own actual output feature;

the driver determining whether the output port is connected to the bus according to the actual output feature;

if the output port is not connected to the bus, the driver starting the motor normally;

if the output port is connected to the bus, the driver disconnecting the output port.

According to one embodiment of the present invention, in the above-mentioned drive control method, the electric signal is a current signal or voltage signal and the preset frequency of the electric signal is different from the frequency of the bus. When the frequency (for example, 20 Hz) of the electric signal is lower than the frequency (for example, 50 Hz) of the bus, the actual output frequency can be used as the above-mentioned actual output feature to determine whether the output port of the driver is directly connected to the bus.

According to one embodiment of the present invention, in the above-mentioned drive control method, the actual output feature includes at least the actual output frequency and/or energy flow direction of the output port.

According to one embodiment of the present invention, in the above-mentioned drive control method, the step of the driver determining whether the output port is connected to the bus according to the actual output feature further comprises:

comparing the actual output frequency of the output port with the preset frequency of the electric signal;

if the actual output frequency is different from the preset frequency, determining that the output port is connected to the bus;

otherwise, determining that the output port is not connected to the bus.

According to one embodiment of the present invention, in the above-mentioned drive control method, the step of the driver determining whether the output port is connected to the bus according to the actual output feature further comprises:

comparing the actual output frequency of the output port with the preset frequency of the electric signal;

if the difference between the actual output frequency and the preset frequency is greater than or equal to a preset threshold, determining that the output port is connected to the bus;

otherwise, determining that the output port is not connected to the bus. The preset threshold can avoid normal frequency fluctuations from influencing a detection.

According to one embodiment of the present invention, in the above-mentioned drive control method, the step of the driver determining whether the output port is connected to the bus according to the actual output feature further comprises:

determining the actual output energy flow direction of the output port;

if the actual output energy flow direction is from the driver to the motor, determining that the output port is not connected to the bus;

if the actual output energy flow direction is from the motor to the driver, determining that the output port is connected to the bus.

According to one embodiment of the present invention, in the above-mentioned drive control method, the actual output feature includes at least whether an electric signal can be collected on the shunt resistor in the output port detection circuit of the output port.

According to one embodiment of the present invention, in the above-mentioned drive control method, the actual output feature includes at least whether a line end voltage signal can be collected on the voltage sampling resistor in the output port detection circuit of the output port.

According to another embodiment of the present invention, a drive system is provided and the drive system comprises a driver, a bus and a motor, wherein the motor is directly connected to the bus (first connection mode) or connected to the driver (second connection mode), wherein the driver feeds an electric signal to the motors through the output port and simultaneously detects its own actual output feature;

wherein the driver determines whether the output port is connected to the bus according to the actual output feature, if the output port is not connected to the bus, the driver starts the motors normally, and if the output port is connected to the bus, the driver disconnects the output port.

According to a further embodiment of the present invention, a processing system is provided and the processing system comprises:

one or more processors, a memory, and one or more programs stored in the memory and configured to be executed by the one or more processors. The one or more programs comprise instructions for executing the method of at least one embodiment.

According to a fourth embodiment of the present invention, a storage medium is provided, the storage medium stores one or more programs, the one or more programs comprise instructions, and when the instructions are executed by a data processing system, the data processing system executes the method of at least one embodiment.

It should be understood that the above general description and the following detailed description of the present invention are both example and illustrative and are aimed at providing a further explanation to the present invention as claimed in the claims.

Now the embodiments of the present invention will be described in detail by reference to the drawings. The preferred embodiments of the present invention will now be referred to in detail. The examples of the preferred embodiments are shown in the drawings. In any possible case, the same reference numeral or symbol is used to represent the same or similar part in all the drawings. In addition, although the terms used in the present invention are selected from common and known terms, some terms mentioned in the description of the present invention may be selected by the applicant according to his or her judgment and their detailed meanings are described in related parts of the document. In addition, it is required that the present invention should be understood not only according to the actual terms used, but also according to the meaning each term implies.

The fundamental and the preferred embodiments of the present invention are discussed in detail by reference to FIG. 4 and FIG. 5.

Figure 2:
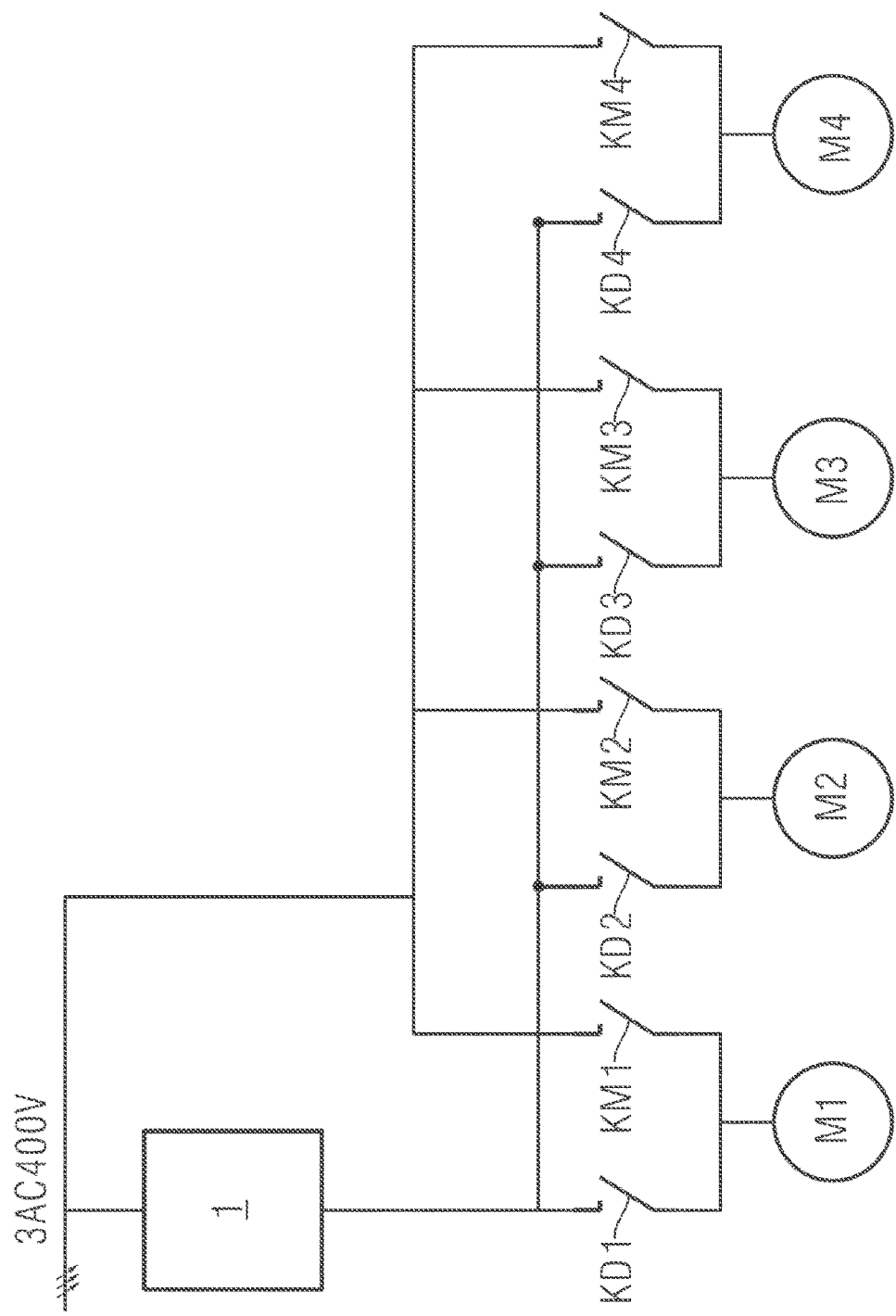
FIG. 2 shows an application example of the multi-pump control for controlling the hydraulic pressure.
Figure 4:
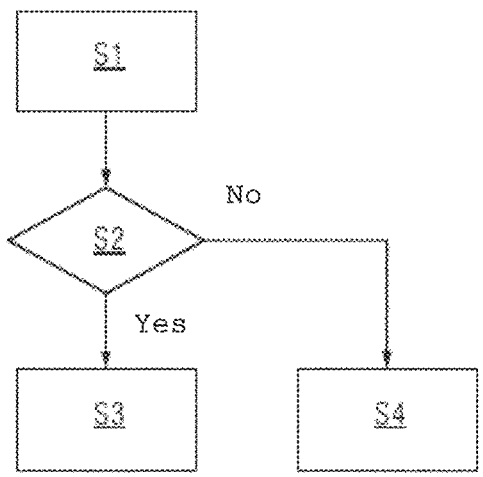
FIG. 4 is a flowchart of one embodiment of the drive control method according to the present invention.

FIG. 4 shows one embodiment of the drive control method according to the present invention. The drive control method is applicable to a drive system comprising a driver, a bus and a motor, for example, the drive system shown in FIG. 2, wherein the motor is directly connected to the bus (first connection mode) or connected to the driver (second connection mode). The drive control method is used to detect the interlocking relationship discussed above and mainly comprises the following steps: the driver feeds an electric signal to the motor through the output port and simultaneously detects its own actual output feature (Step S1); the driver determines whether the output port is connected to the bus according to the actual output feature (Step S2); if the output port is not connected to the bus, the driver starts the motor normally (Step S3); if the output port is connected to the bus, the driver disconnects the output port to protect itself (Step S4). In addition, the present invention allows the restart of the execution of Steps S1 to S4 after a preset period of time as of the disconnection of the output port so as to recheck the interlocking state.

Figure 3:
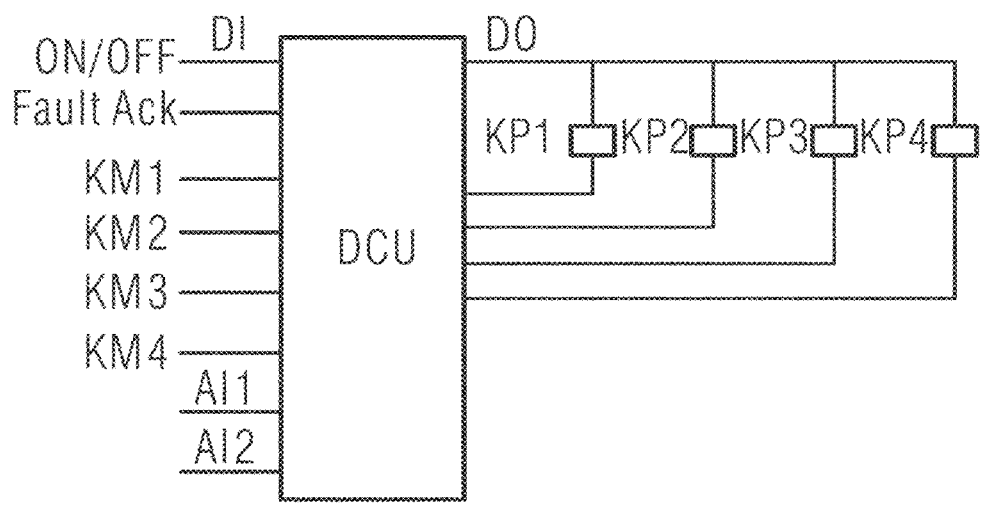
FIG. 3 is a schematic diagram for the interfaces of the drive control unit of the driver.

The above-mentioned drive control method can detect the interlocking state to automatically protect the driver itself and improve the stability and reliability of the system. The realization of the drive control technique requires no modification to the circuit or structure of the driver of the prior art. In addition, the drive control method can omit the mechanical interlocking switch adopted in the prior art to reduce the cost of the system, or the present invention can omit the occupation of some DI ports (namely, KM1, KM2, KM3 and KM4 in FIG. 3) of the drive control unit shown in FIG. 3 so that these DI ports can be used to process additional functions such as emergency cut-off and expand the use of the driver.

The electric signal in Step S1 is a current signal or a voltage signal, the preset frequency of the electric signal is different from the frequency of the bus (for example, the preset frequency of the electric signal is 20 Hz, and the current frequency of the bus is 50 Hz) and the actual output feature includes at least the actual output frequency and/or energy flow direction of the output port. In addition, in some embodiments, the actual output feature may further include the internal DC link voltage of the driver itself.

When the actual output frequency of the output port is used to determine whether the output port is connected to the bus, the driver compares the actual output frequency of the output port with the preset frequency of the electric signal; if the actual output frequency is different from the preset frequency, the driver determines that the output port is connected to the bus; otherwise, the driver determines that the output port is not connected to the bus. For example, when the preset frequency of the electric signal is 20 Hz and the current frequency of the bus is 50 Hz, if the driver is connected to the bus, the current frequency of the bus will superimpose over the frequency of the electric signal. As a result, the actual output frequency of the output port rises, obviously higher than 20 Hz.

Alternatively, to avoid the normal fluctuations of the actual output frequency of the output port from influencing the above-mentioned determination, the comparison step in the above-mentioned method can be changed as follows: the driver determines whether the difference between the actual output frequency and the preset frequency is greater than or equal to a preset threshold and then determines whether the output port is connected to the bus according to the comparison result.

When the actual output energy flow direction of the output port is used to determine whether the output port is connected to the bus, the step of the driver determining whether the output port is connected to the bus according to the actual output feature further comprises determining the actual output energy flow direction of the output port, determining that the output port is not connected to the bus if the actual output energy flow direction is from the driver to the motor, and determining that the output port is connected to the bus if the actual output energy flow direction is from the motor to the driver. Since the current on the bus is obviously higher than the current of the electric signal, the current from the bus will change the energy flow direction of the electric signal if the driver is directly connected to the bus.

Figure 5:
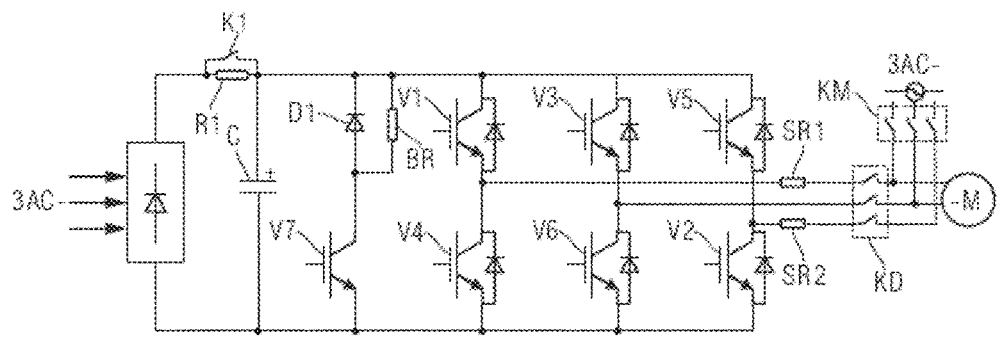
FIG. 5 shows one embodiment of the output port detection circuit performing the output port detection function.

FIG. 5 shows one embodiment of the output port detection circuit performing the output port detection function. The circuit structure is set in the driver and can be realized by use of many known methods in the prior art. Therefore, the present invention is not limited to the embodiment of the circuit shown in FIG. 5. During the output port detection, the inverter bridges (IGBT V1-V6) are kept disconnected. In this case, the reverse parallel diodes of the isolated gate bipolar transistors (IGBTs) are used as rectifiers. SR1 and SR2 in FIG. 5 are shunt resistors and are used to measure the actual output current of the driver. When V7 is connected, the braking resistor BR will consume the electric energy of the DC bus capacitor C. If the output port is not connected to the line end, no current signal will be detected on SR1 or SR2. Contrarily, if the output port is connected to the line end, the line end will charge the capacitor C through the above-mentioned IGBT rectifiers, and thus a current signal can be detected on SR1 and SR2. If the relay K1 is disconnected, the pre-charging resistor R1 will be joined in the input charging path so that the normal input port charging is reduced, while the charging through the IGBTs becomes more significant, and thus, the shunt currents on SR1 and SR2 are more significant.

In addition, if a voltage signal needs to be sampled, only a plurality of voltage sampling resistors need to be arranged between the shunt resistors SR1 and SR2 and the motor. The particular realization method is known in the art and will not be described here. In such an embodiment, whether the output port is connected to the bus can be determined by determining whether a line end voltage signal can be collected on the voltage sampling resistor.

In addition, each embodiment of the present invention can be realized by the data processing program executed by the processing system, for example, a computer. Obviously, the data processing program constitutes the present invention. In addition, the data processing program stored in a storage medium is usually executed by directly reading out the program from the storage medium or installing or copying the program in the storage device (for example, hard disk or memory) of the processing system. Thus, such a storage medium also constitutes the present invention. The storage medium can be any type of recording medium, for example, paper storage medium (such as paper tape), magnetic storage medium (such as floppy disk, hard disk and flash), optical storage medium (such as CD-ROM), and magneto-optical storage medium (such as MO disk).

Therefore, the present invention further discloses a non-volatile storage medium, in which a data processing program is stored and the data processing program is used to execute any embodiment of the above-mentioned method of the present invention.

In addition, the steps of the method in embodiments of the present invention can be realized not only by a data processing program, but also by hardware, for example, logic gate, switch, application specific integrated circuit (ASIC), programmable logic controller or embedded micro-controller. Therefore, the hardware realizing the method in the present invention also constitutes the present invention.

In summary, the drive control method, drive system, processing system and storage medium in the present invention can detect the interlocking state by use of the control method to automatically protect the driver itself and improve the stability and reliability of the system. The realization of the drive control technique requires no modification to the circuit or structure of the driver of the prior art, and the interlocking switch required in the prior art can be omitted, thus reducing the cost of the system.

It will be appreciated by those skilled in the art that various modifications and variations can be made to the above-mentioned example embodiments of the present invention without departing from the spirit and scope of the present invention. Therefore, the present invention is intended to cover all modifications and variations made to the present invention in the scope of the attached claims and the equivalent technical solutions.

The invention claimed is:

1. A drive control method applicable to a drive system including a driver, a bus and a motor, the motor being directly connected to the bus in a first connection mode or connected to the driver in a second connection mode, the drive control method comprising:
feeding a preset electric signal to the motor, via the driver, through an output port of the driver and simultaneously detecting an actual output frequency of the output port of the driver, the driver being configured to determine a switch interlock relationship by determining whether the output port is connected to the bus based on a comparison of the actual output frequency of the output port to the preset electric signal;
the driver starting the motor normally upon determining that the output port is not connected to the bus when the actual output frequency of the output port is not different from the preset electric signal; and
the driver disconnecting the output port upon determining that the output port is connected to the bus when the actual output frequency of the output port is different from the preset electric signal.

2. The drive control method of claim 1, wherein the preset electric signal is a current signal or a voltage signal, and wherein a frequency of the electric signal is different from a frequency of the bus.

3. A non-transitory storage medium storing one or more programs, the one or more programs comprising instructions, and upon the instructions being executed by a data processing system, the data processing system is configured to execute the drive control method of claim 1.

4. The drive control method of claim 1, wherein the output port being connected to the bus indicates that the motor is connected in both the first connection mode and the second connection mode.

5. The drive control method of claim 2, wherein the actual output frequency includes at least one of the actual output frequency or an energy flow direction of the output port.

6. The drive control method of claim 2, wherein the actual output frequency includes at least whether an electric signal is collectable on a shunt resistor in an output port detection circuit of the output port.

7. The drive control method of claim 2, wherein the actual output frequency includes at least whether a line end voltage signal is collectable on a voltage sampling resistor in an output port detection circuit of the output port.

8. A non-transitory storage medium storing one or more programs, the one or more programs comprising instructions, and upon the instructions being executed by a data processing system, the data processing system is configured to execute the drive control method of claim 2.

9. The drive control method of claim 5, wherein the determining whether the output port is connected to the bus according to the actual output frequency comprises:
comparing the actual output frequency of the output port with the frequency of the preset electric signal;
upon the comparing indicating that a difference between the actual output frequency and the frequency of the electric signal is greater than or equal to a threshold, determining that the output port is connected to the bus; and
upon the comparing indicating that the difference between the actual output frequency and the frequency of the electric signal is not greater than or equal to the threshold, determining that the output port is not connected to the bus.

10. The drive control method of claim 5, wherein the determining whether the output port is connected to the bus according to the actual output frequency comprises:
determining an actual output energy flow direction of the output port;
upon the determining that the actual output energy flow direction of the output port is from the driver to the motor, determining that the output port is not connected to the bus; and
upon the determining that the actual output energy flow direction of the output port is from the motor to the driver, determining that the output port is connected to the bus.

11. A non-transitory storage medium storing one or more programs, the one or more programs comprising instructions, and upon the instructions being executed by a data processing system, the data processing system is configured to execute the drive control method of claim 5.

12. A drive system, comprising:
a driver;
a bus; and
a motor, the motor being directly connected to the bus in a first connection mode or connected to the driver in a second connection mode,
wherein the driver is configured to
feed a preset electric signal to the motor through an output port of the driver and is configured to simultaneously detect an actual output frequency at the output port of the driver, the driver being further configured to determine a switch interlock relationship by
determining whether the output port is connected to the bus based on a comparison of the actual output frequency and the preset electric signal,
upon determining that the output port is not connected to the bus, the driver is configured to start the motor normally when the actual output frequency is not different from the preset electrical signal, and
upon determining that the output port is connected to the bus, the driver is configured to disconnect the output port when the actual output frequency is different from the preset electrical signal.

13. The drive system of claim 12, wherein the preset electric signal is a current signal or a voltage signal, and wherein a frequency of the electric signal is different from a frequency of the bus.

14. The drive system of claim 12, wherein the actual output frequency includes at least one of the actual output frequency or an energy flow direction of the output port.

15. The drive system of claim 12, further comprising:
a first switch connected between the motor and the bus, the first switch configured to directly connect the motor to the bus in the first connection mode; and
a second switch connected between the motor and the driver, the second switch configured to connect the motor to the driver in the second connection mode.

16. A processing system, comprising
one or more processors; and
a memory storing one or more programs configured to be executed by the one or more processors, the one or more programs including instructions for executing a drive control method applicable to a drive system including a driver, a bus and a motor, the motor being directly connected to the bus in a first connection mode or connected to the driver in a second connection mode, the drive control method including
feeding a preset electric signal to the motor, via the driver, through an output port of the driver and simultaneously detecting an actual output frequency at the output port of the driver, the driver being configured to determine a switch interlock relationship by determining whether the output port is connected to the bus according to a comparison of the actual output frequency to the preset electric signal;
the driver starting the motor normally upon determining that the output port is not connected to the bus when the actual output frequency of the output port is not different from the preset electric signal; and
the driver disconnecting the output port upon determining that the output port is connected to the bus when the actual output frequency of the output port is different from the preset electric signal.

17. The processing system of claim 16, wherein the preset electric signal is a current signal or a voltage signal, and wherein a frequency of the preset electric signal is different from a frequency of the bus.

18. The processing system of claim 16, wherein the actual output frequency includes at least one of the actual output frequency or an energy flow direction of the output port.

* * * * *